(12) United States Patent
Wang et al.

(10) Patent No.: US 8,588,518 B2
(45) Date of Patent: Nov. 19, 2013

(54) SUPERPIXEL-BOOSTED TOP-DOWN IMAGE RECOGNITION METHODS AND SYSTEMS

(75) Inventors: Su Wang, San Jose, CA (US);
Shengyang Dai, San Jose, CA (US);
Akira Nakamura, San Jose, CA (US);
Takeshi Ohashi, Kanagawa (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 12/951,702

(22) Filed: Nov. 22, 2010

(65) Prior Publication Data

US 2012/0128237 A1    May 24, 2012

(51) Int. Cl.
*G06K 9/62*    (2006.01)

(52) U.S. Cl.
USPC .......................................................... 382/159

(58) Field of Classification Search
None
See application file for complete search history.

(56) References Cited

U.S. PATENT DOCUMENTS

| 2007/0217676 A1* | 9/2007 | Grauman et al. ............. 382/170 |
| 2009/0080774 A1 | 3/2009 | Lin et al. |
| 2010/0318515 A1* | 12/2010 | Ramanathan et al. ........ 707/723 |

OTHER PUBLICATIONS

O. Veksler and Y. Boykov. Superpixels and supervoxels in an energy optimization framework. In ECCV, 2010.*
Brian Fulkerson et al., "Class Segmentation and Object Localization with Superpixel Neighborhoods",IEEE 12 International Conference on Computer Vision (ICCV), 2009, pp. 670-677, Department of Computer Science, University of California, Los Angeles, CA 90095, Department of Engineering Science, University of Oxford, UK.
Olfa Besbes et al., "Contextual Classification of High-Resolution Satellite Images", IEEE, 2009.
John Kaufhold et al.,"Recognition and Segmentation of Scene Content us Region-Based Classification", IEEE, 2006, Proceedings of the 18th International Conference on Patter Recognition (ICPR'06), Advanced Concepts Business Unit SAIC, McLean, VA 22102, Roderick Collins and Anthony Hoogs, GE Global Research Once Research Circle, Niskayuna, NY 12309, Pascale Rondot, Lockheed Martin Aeronautics, Forth Worth, TX.
Sylvian Boltz et al.,"Earth Mover Distance on Superpixels", IEEE, Proceeds of IEEE 2012 17th International Conference on Image Processing, Sep. 26-29, 2010, Hong Kong, pp. 4597-4600, Ecole Polytechnique, France, UCLA Vision Lab.
John Kaufhold et al.,"Learning to Segment Images Using Region-Based Perceptual Features", Proceedings of the 2004 IEEE Computer Society Conference on Computer Vision and Pattern Recognition (CVPR'04), 2004, Visualization and Computer Vision Laboratory, General Electric Global Research Center.
X. Ren and J. Malik, "Learning a classification model for segmentation," Ninth IEEE Conference on Computer Visio, vol. 1, pp. 10-17, 2003.
J. Malik, S. Belongie, T, Leung and J. Shi, "Contour and texture analysis for image segmentation," International Journal of Computer Vision, 43(1), pp. 7-27, 2001.

(Continued)

*Primary Examiner* — Nirav G Patel
(74) *Attorney, Agent, or Firm* — Haverstock Owens LLP

(57) ABSTRACT

Systems and methods for implementing a superpixel boosted top-down image recognition framework are provided. The framework utilizes superpixels comprising contiguous pixel regions sharing similar characteristics. Feature extraction methods described herein provide non-redundant image feature vectors for classification model building. The provided framework differentiates a digitized image into a plurality of superpixels. The digitized image is characterized through image feature extraction methods based on the plurality of superpixels. Image classification models are generated from the extracted image features and ground truth labels and may then be used to classify other digitized images.

5 Claims, 8 Drawing Sheets

(56) References Cited

OTHER PUBLICATIONS

Xuming He et al., "Learning and Incorporating Top-Down Cues in Image Segmentation", Department of Computer Science, University of Toronto, {hexm, zemel,debray}@cs.toronto.edu, May 2006.

Rasmussen, C. Scott, D., "Shape-guided superpixel grouping for trail detection and tracking", IEEEXplore Digital Library, Intelligent Robots and Systems, Sep. 22-26, 2008, IROS 2008, IEEE/RSJ International Conference, pp. 4092-4097,Location: Nice, Print ISBN: 978-1-4244-2057-5, INSPEC Accession No. 10364251, Digital Object Identifier:10.1109/IROS.2008.4651171, Dave of Current Version: Oct. 14, 2008.

David Engel et al., "Medial Features for Superpixel Segmentation", Max Planck Institute for Biological Cybernetics Sepmannstr, 38, Tubingen, Germany, firstname.lastname@tuebingen.mpg.de, Autonomous Systems Lab, ETH Zurich Tannenstrasse 3, Zurich, Switzerland, firstname.lastname@mavt.ethz.ch, 2009.

\* cited by examiner

SUPERPIXEL-BOOSTED TOP-DOWN IMAGE RECOGNITION METHODS AND SYSTEMS

TECHNICAL FIELD

The present disclosure relates to systems and methods for classifying digital image data.

BACKGROUND

Conventional computer-implemented top-down image recognition methods build classification models based on features extracted from a subset of pixels in a digital image. Features for a specific pixel are extracted from both the specific pixel and a surrounding feature extraction region comprising neighboring pixels. The digital images from which features are extracted are labeled by humans with ground truths representing the classification of each pixel or region of pixels. The labeled images are then used in conjunction with the extracted features to build models to automatically classify the features of new images. Conventional top-down image recognition frameworks rely on randomly-determined pixels and feature extraction regions for feature extraction during a model training phase. Conventional feature extraction techniques using randomly-determined pixels are easy to implement, but have several drawbacks. Randomly-determined feature extraction regions are likely to overlap, causing some image data to be redundantly sampled. Randomly-determined feature extraction regions may not cover an entire image, and the subsequently-generated models may therefore have data gaps. Randomly-determined feature extraction regions may also suffer from inhomogeneity in the characteristics of their constituent pixels. In a classification stage of a conventional top-down image recognition framework, classifying a digital image comprising several megapixels pixel by pixel is a time intensive task.

SUMMARY

Methods and systems are disclosed herein for processing digital images. One embodiment consistent with the disclosure utilizes superpixel boosted feature extraction techniques and classification methods to implement a superpixel-boosted top-down image recognition framework. A computer-implemented feature extraction method for generating a classification model for a digitized image performed by a system comprising at least one processor and at least one memory comprises the steps of differentiating by the system the digitized image into a plurality of superpixels, each comprising a plurality of pixels, based on pixel characteristics; determining by the system a plurality of center pixels of the plurality of superpixels; characterizing by the system the plurality of center pixels of the plurality of superpixels; generating by the system a classification model by associating features of the plurality of center pixels with labels of a plurality of ground truths wherein the plurality of ground truths are associated with a plurality of image classifications; and outputting by the system the classification model for classifying all or some of the pixels of a second digitized image.

BRIEF DESCRIPTION OF DRAWINGS

The accompanying drawings, which are incorporated in and constitute a part of this specification, together with the description, serve to explain the principles of the inventions described herein.

DETAILED DESCRIPTION

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be taken in a limited sense. The exemplary superpixel-boosted image recognition techniques presented here may refer to specific examples for illustration purposes. It is understood that these image recognition techniques are not limited to use with any particular class or type of digital images.

Exemplary systems and methods disclosed herein use a superpixel-boosted image recognition framework to improve performance of automated or semi-automated feature extraction over that of a conventional top-down image recognition framework. Superpixels may be characterized as disjoint collections of pixels sharing similar characteristics, such as color, texture, or intensity, and may cover an entire image. Superpixels may be utilized to better place feature extraction regions, or may themselves be used as feature extraction regions. Disjoint superpixels may reduce feature extraction redundancy. Superpixels covering an entire image may reduce data gaps during model generation. Superpixels comprising pixels sharing similar characteristics may improve the specificity of feature extraction. During a classification task, a digital image may be classified superpixel by superpixel, thus decreasing the time required for such a task.

Figure 1:
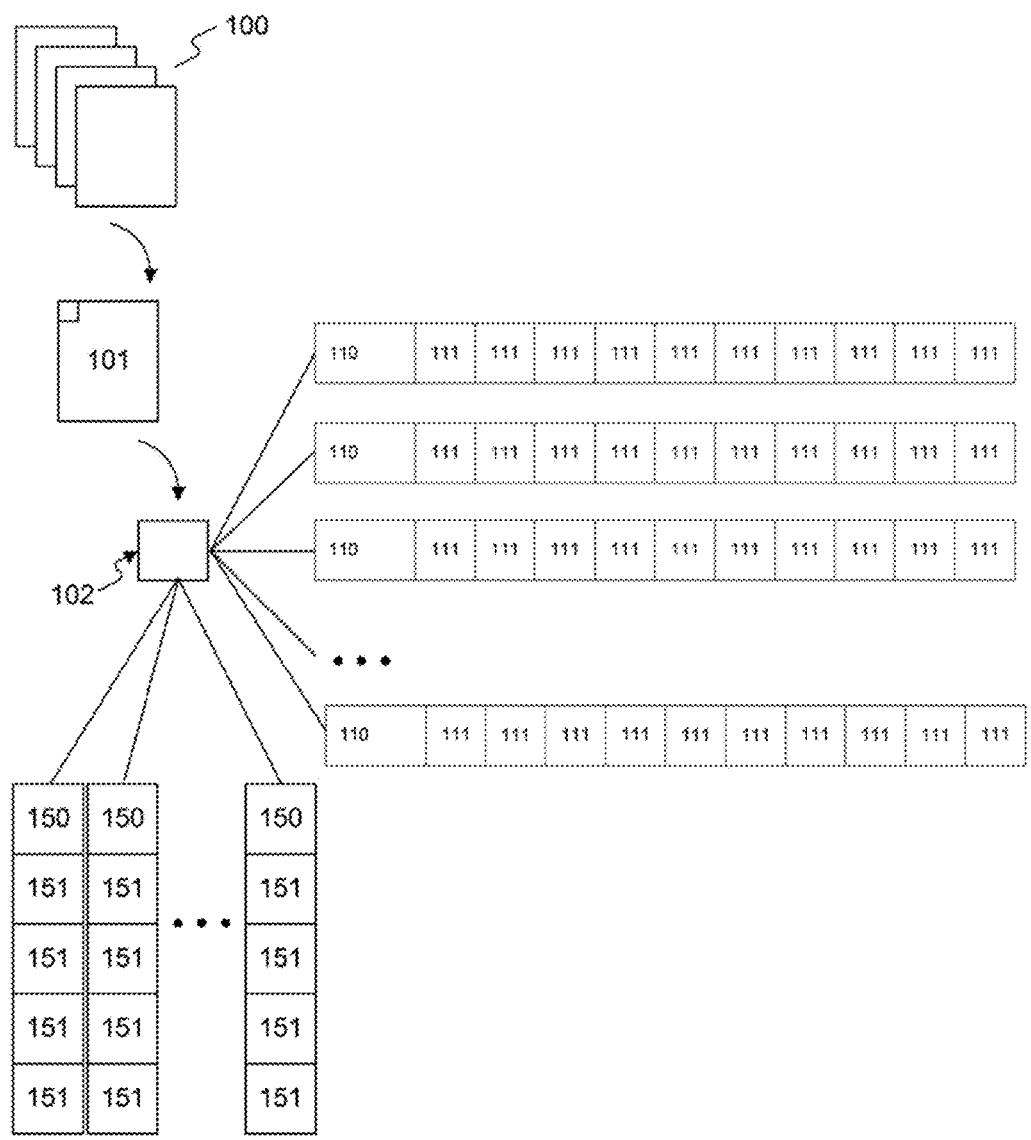
FIG. 1 illustrates the structure of an image training data set for use in a conventional top-down image recognition framework.

FIG. 1 illustrates the structure of an image training data set 100 for use in a conventional top-down image recognition framework. An image training data set 100 may comprise multiple digital training images 101 that have been labeled by an operator with ground truths 150. Each ground truth 150 may comprise multiple ground truth labels 151. Individual pixels or image regions comprising multiple pixels of a training image 101 may be examined by a trained operator and assigned a ground truth label 150 based on characteristics of the individual pixels or region. All or some of the pixels 102 of a digital training image 101 may be labeled by an operator with multiple ground truth labels 150, each comprising multiple labels 151.

All or some of the labeled training pixels 102 of a digital training image 101 may be also characterized by multiple pixel features 110, each of a different feature type, such as color or texture feature types. Each pixel feature 110 may be characterized by multiple feature descriptors 111. The features 110 and feature descriptors 111 characterizing each pixel may contain data related to the pixel itself or may contain data related to the local and global neighboring pixels.

For instance, a designated pixel may be characterized by a color pixel feature 110, of a color feature type, that may comprise multiple color pixel feature descriptors 111. A color pixel feature descriptor 111 may contain, for example, information pertaining to the color of the designated pixel or to the color of the pixels surrounding the designated pixel, either locally or globally. A labeled and characterized training pixel 102 of the characterized digital training image 101 may be characterized by all or some of the pixel features 110 to be utilized by an image recognition framework. A characterized pixel 102 may be characterized by multiple features 110 and multiple ground truths 150, each comprising multiple labels 151. A conventional image feature extraction technique may extract features from all or some of the pixels 102 of a training image.

Figure 2:
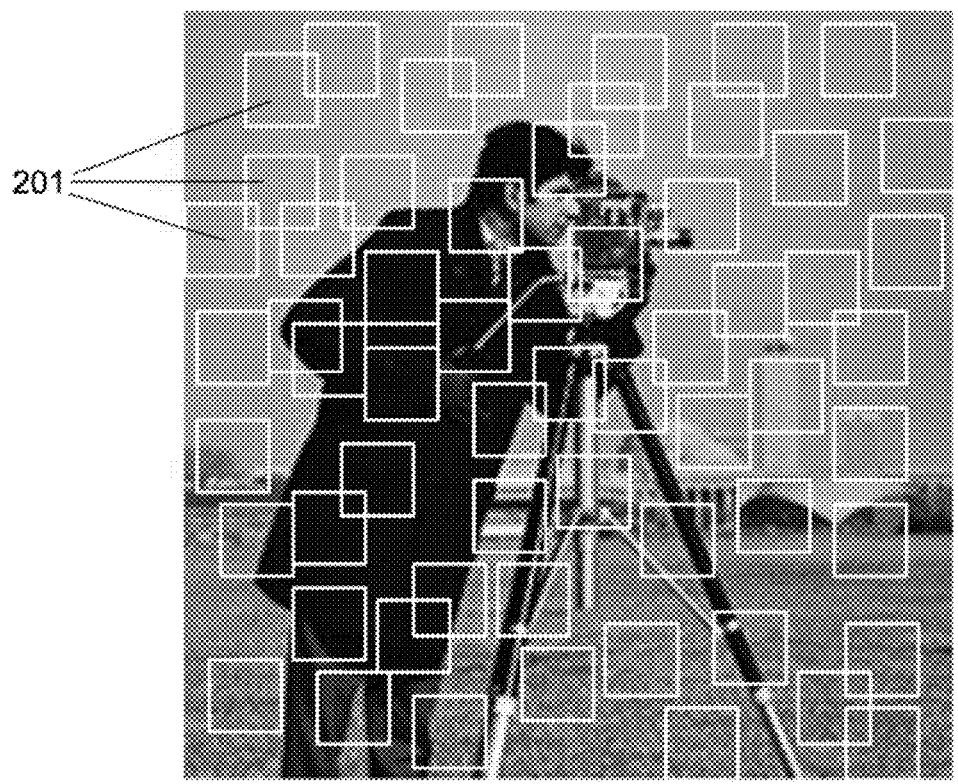
FIG. 2 depicts the randomly-determined pixel locations and feature extraction regions of a conventional feature extraction technique.

FIG. 2 depicts the randomly-determined pixel locations and feature extraction regions 201 of a conventional feature extraction technique. In a conventional feature extraction technique, pixel features 110 are extracted from randomly-sampled pixels to characterize the randomly-sampled pixels. In a conventional feature extraction technique, the neighboring pixels used to characterize a randomly-sampled pixel typically come from a square feature extraction region 201, as shown in FIG. 2. In the conventional feature extraction region placement technique shown in FIG. 2, the square feature extraction regions 201 are centered on randomly-sampled pixels.

Conventional feature extraction techniques use the randomly-sampled pixels in order to decrease the computing resources that would be required to extract features from all of the pixels of a digital image. As shown in FIG. 2, the method of randomly sampling has several drawbacks. Because the feature extraction regions 201 are randomly placed, they may overlap and therefore create redundancies, or they may be placed too far apart, and therefore fail to gather information from particular parts of the image. Additionally, the random placement of the extraction regions 201 ignores any details in the image itself.

Figure 3:
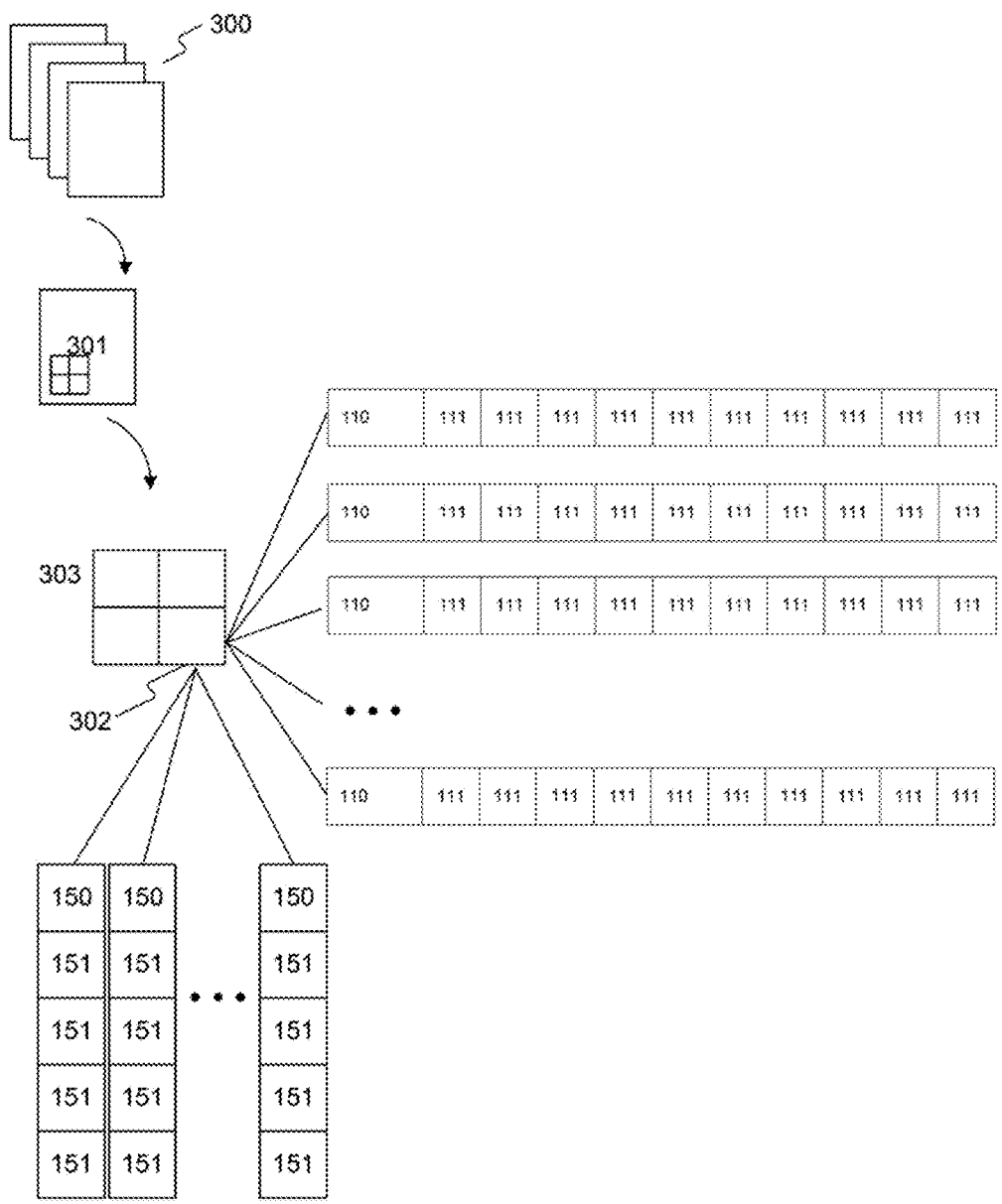
FIG. 3 illustrates an exemplary structure of a superpixel image training data set for use in a superpixel-boosted top-down image recognition framework consistent with the principles described herein.

FIG. 3 illustrates an exemplary structure of a superpixel image training data set 300 for use in a superpixel-boosted top-down image recognition framework consistent with the principles described herein. In a super-pixel boosted top-down image recognition framework, a superpixel training image 301 may be differentiated into multiple superpixels 303. As used herein, superpixels 303 represent contiguous groups of pixels sharing similar characteristics, such as color, texture, intensity, etc. Superpixels 303 may be determined by suitable image analysis techniques.

For instance, superpixels 303 may be determined by assigning each pixel of an image a probability, based on color and texture analysis, representing the likelihood that the pixel is located on an object boundary. A boundary probability map may thus be created. Superpixels may then be generated using a segmentation algorithm based on the boundary probability map to determine the most likely object boundaries. The number of superpixels required for an image may vary based on, for instance, the density of the distribution of textural image details.

Pixels 302 of a superpixel training image 301 may be characterized and labeled by features 110 and ground truths 150 as previously described with respect to FIG. 1.

Figure 4:
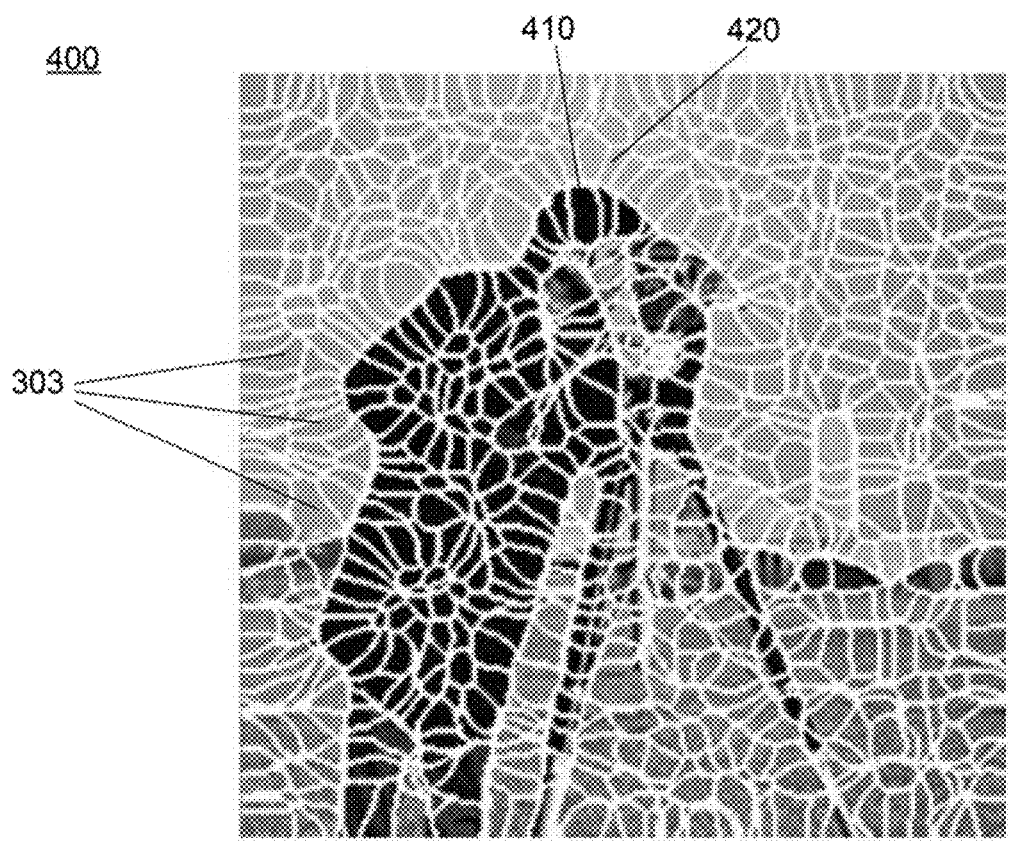
FIG. 4 depicts an exemplary superpixelated image differentiated by multiple superpixels.

FIG. 4 depicts an exemplary superpixelated image 400 differentiated by multiple superpixels 303. FIG. 4 illustrates the effect of superpixel differentiation as described herein. As previously discussed with respect to FIG. 3, superpixels 303 may be determined based on shared characteristics. In this manner, the boundaries of the superpixels 303 may coincide with natural edges within an image. For instance, in the exemplary superpixelated image 400, the pixels that make up the cameraman's hair share characteristics with each other, e.g. color, texture, and intensity, that differ from the pixels that make up the background sky. This difference between the shared characteristics of exemplary superpixel 410 and exemplary superpixel 420 creates a superpixel boundary that coincides with a natural boundary within a superpixelated image 400. The size of the superpixels 303 is not fixed, and may be predetermined or determined dynamically based on image characteristics.

Figure 5A:
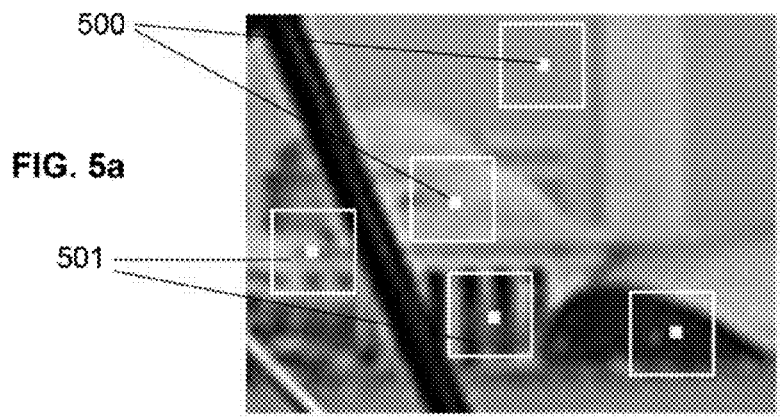
FIGS. 5*a-c* illustrate exemplary superpixel-boosted feature extraction techniques consistent with the present disclosure.
Figure 5B:
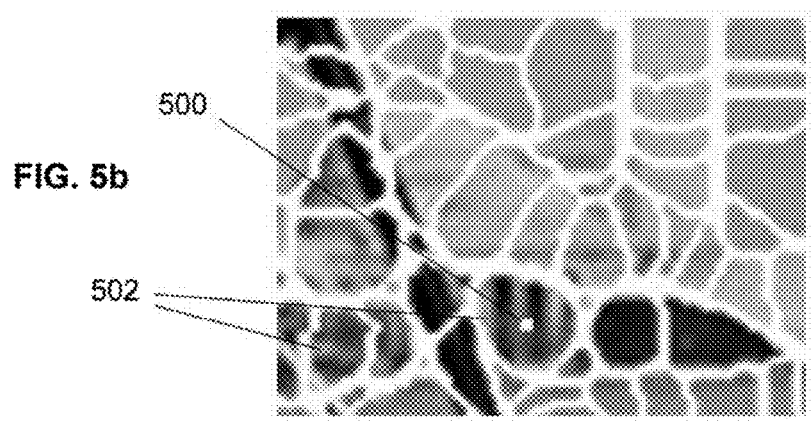
Figure 5C:
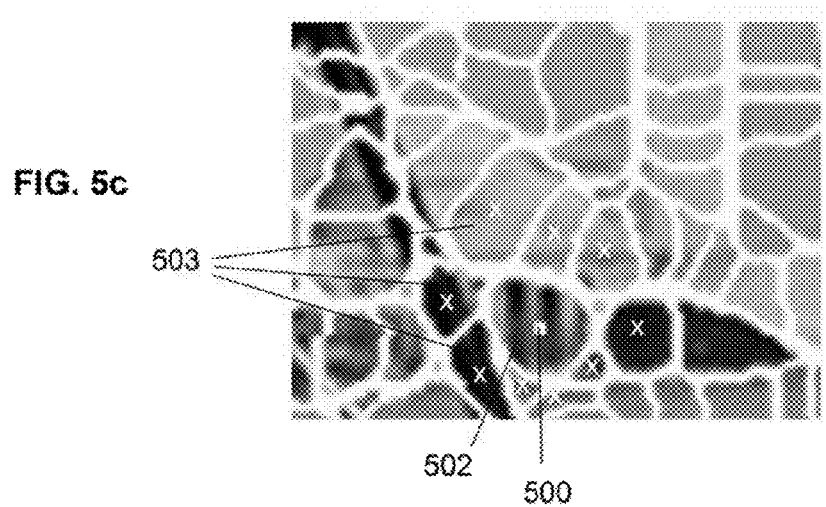

FIGS. 5a-c illustrate exemplary superpixel-boosted feature extraction techniques consistent with the present disclosure.

FIG. 5a illustrates an exemplary superpixel-centered feature extraction technique. In a superpixel-centered feature extraction technique, superpixel-centered feature extraction regions 501 are used to define the neighboring pixels from which data is drawn to characterize pixels 302 of a superpixel training image 301. In a technique consistent with FIG. 5a, a center pixel 500 located at the center of a superpixel 303 may be characterized with features 110 and feature descriptors 111 based on data drawn from the both the center pixel 500 and neighboring pixels 302 located within a feature extraction region 501. A feature extraction region 501 may be defined by a region outline centered on the center pixel 500. As shown in FIG. 5a, a square region outline may be used. However, other shapes, such as circles, and other sizes may also be used as a region outline. Because superpixels 303 define regions based on similar characteristics, a feature extraction region 501 centered on a center pixel 500 will contain many pixels sharing similar characteristics.

FIG. 5b illustrates an exemplary single-superpixel feature extraction technique. In a single-superpixel feature extraction technique, superpixel feature extraction regions 502 may be defined by the boundaries of the superpixels 303. A center pixel 500 may be characterized with features 110 and feature descriptors 111 based on data drawn from both the center pixel 500 and neighboring pixels 302 located within the superpixel feature extraction region 502. Because superpixels 303 define regions based on similar characteristics, a feature extraction region 502 defined by superpixel 303 boundaries will contain pixels sharing similar characteristics.

FIG. 5c illustrates an exemplary multi-superpixel feature extraction technique. In a multi-superpixel feature extraction technique, a center pixel 500 may be characterized with features 110 and feature descriptors 111 based on data drawn from both the center pixel 500 and the neighboring pixels 302 located within the feature extraction region 502, and the pixels 302 located within the neighboring feature extraction regions 503. The neighboring feature extraction regions 503, shown in FIG. 5c as marked with an x, may be defined by the boundaries of neighboring superpixels 303.

In the exemplary method for multi-superpixel feature extraction shown in FIG. 5c, features may be extracted in three stages. First, features 110 and feature descriptors 111 may be generated based on data drawn from center pixel 500 and the neighboring pixels to center pixel 500 located within the feature extraction region 502. Features 110 and feature descriptors 111 may be generated based on data drawn from the neighboring pixels. The features 110 and feature descriptors 111 that are generated may be concatenated into a single image feature vector representing the summation of the extracted features 110 and feature descriptors 111.

Figure 6:
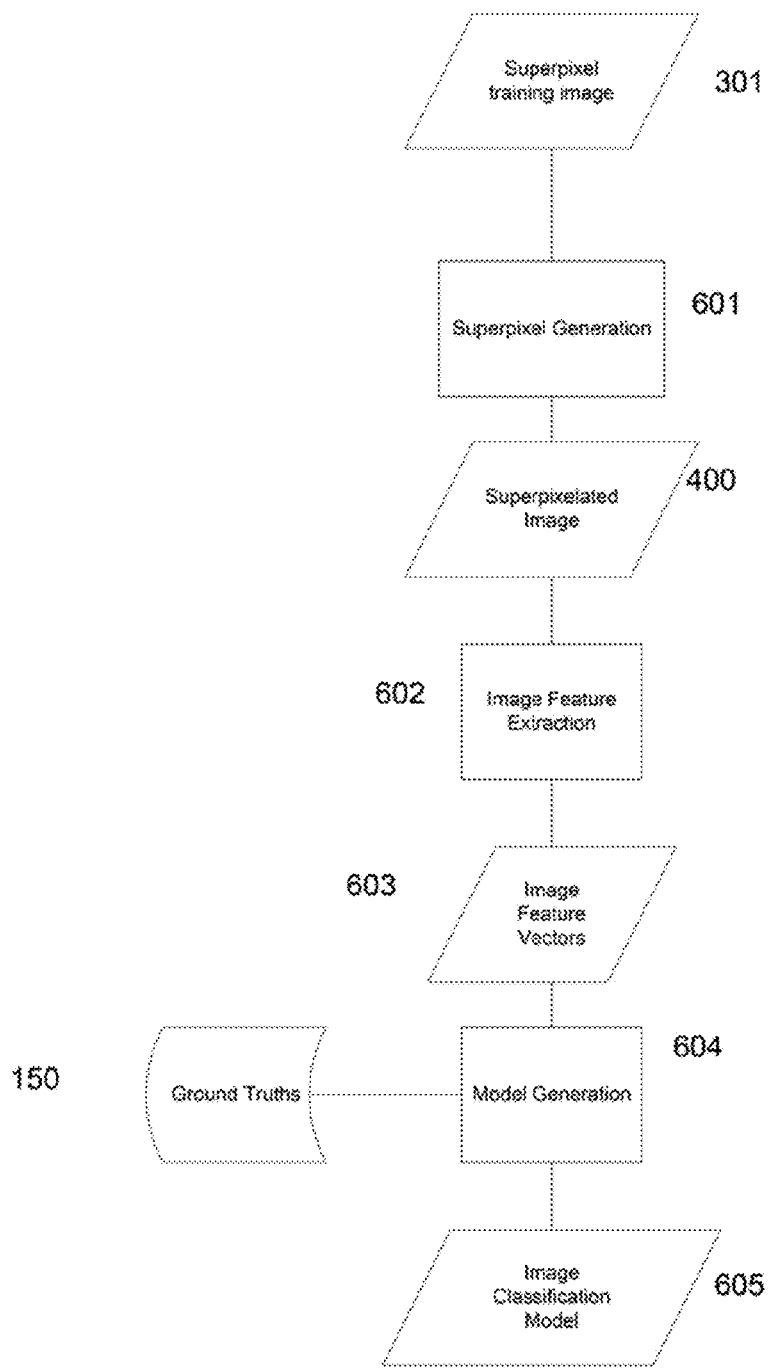
FIG. 6 is a flowchart showing the steps of an exemplary method for performing superpixel-boosted top-down image recognition model training consistent with the present disclosure.

FIG. 6 is a flowchart showing the steps of an exemplary method for performing superpixel-boosted top-down image recognition model training consistent with the present disclosure. The method utilizes superpixel-boosted feature extraction techniques, as shown in FIGS. 5*a*-5*c*, to extract image features to build an image classification model 605.

In step 601, a superpixel training image 301 is differentiated into a superpixelated image 400. The superpixelated image 400 is processed at image feature extraction step 602 according to methods previously described with reference to FIGS. 5*a*-*c*. Superpixel-centered feature extraction, single-superpixel feature extraction, and multi-superpixel feature extraction may all be used collaboratively at the image feature vector extraction step. In image feature extraction step 602, features 110 and feature descriptors 111 are extracted for center pixels 500, and the features 110 and feature descriptors 111 may be combined into image feature vectors 603 for center pixels 500. Image feature vectors 603 may comprise data from all or some of the features 110 and feature descriptors 111. Image feature vectors 603 may be used as input to a model generation step 604.

Machine learning techniques may then be used to build an image classification model 605 from image feature vectors 603 and ground truths 150 of the characterized and labeled training image 301, at model generation step 604. An image classification model 605 may be built by associating feature descriptors 111 of image feature vector 603 with labels 151 of ground truths 150.

Figure 7:
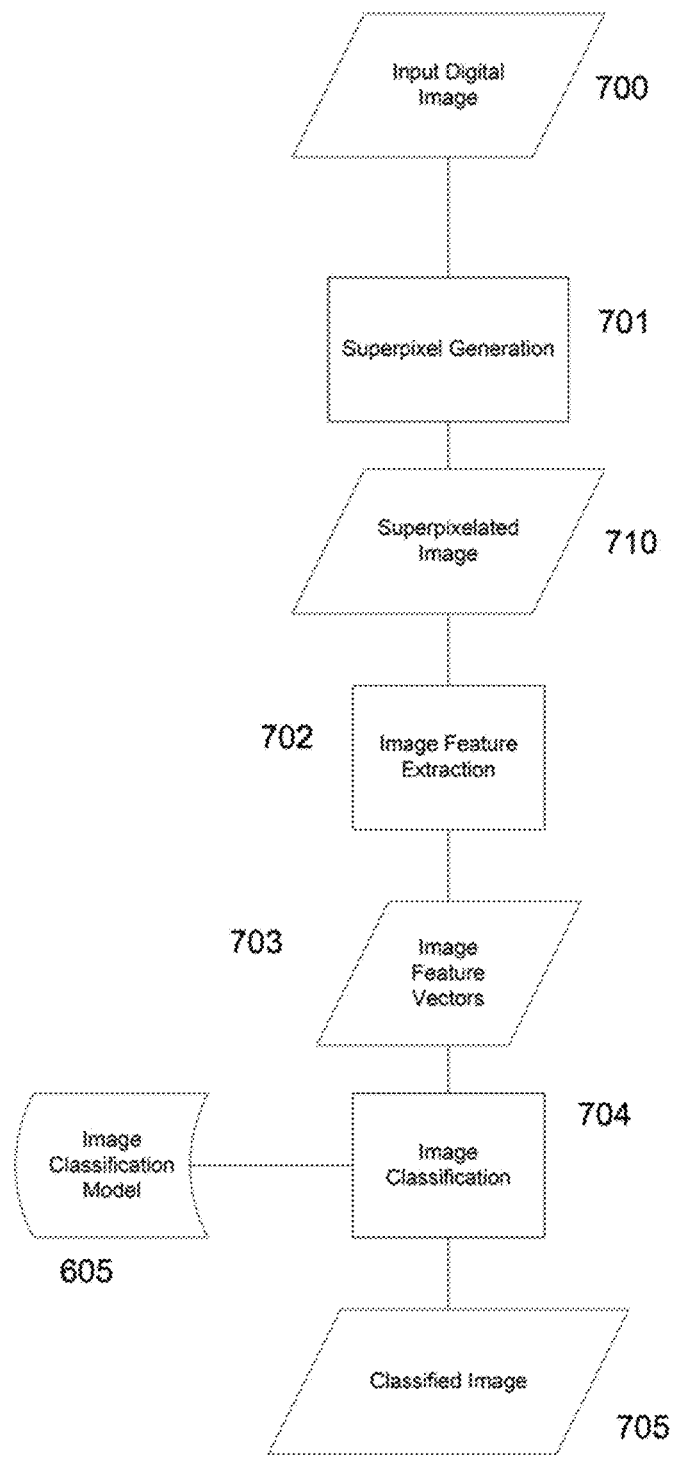
FIG. 7 is a flowchart showing the steps of an exemplary method for performing superpixel-boosted top-down image recognition classification consistent with the present disclosure.

FIG. 7 is a flowchart showing the steps of an exemplary method for performing superpixel-boosted top-down image recognition classification consistent with the present disclosure. The method utilizes superpixel-boosted feature extraction techniques, as shown in FIGS. 5*a*-5*c* to build image feature vectors 703 for processing by an image classification model 605 to classify pixels of an input digital image 700.

In step 701, an input digital image is differentiated into a superpixelated image 710. Superpixelated image 700 is processed at image feature extraction step 702 according to methods previously described with reference to FIGS. 5*a*-*c*. Superpixel centered feature extraction, single-superpixel feature extraction, and multi-superpixel feature extraction may all be used, alone or in any combination, at image feature vector extraction step. Feature extraction techniques may be chosen to coincide with those used in building the classification model 605 during a model training task as shown in FIG. 6. In image feature extraction step 702, features 110 and feature descriptors 111 are extracted for center pixels 500, and the extracted features 110 and feature descriptors 111 may be combined into image feature vectors 703 for center pixels 500. Image feature vectors 703 may comprise data from all or some of the features 110 and feature descriptors 111 extracted during feature extraction step 702. Image feature vectors 703 may then be used as input to an image classification step 704.

Machine learning techniques may then be used to classify the pixels of input digital image 700, at image classification step 704. Classification model 605 may be utilized to classify characterized center pixels 500 according to features 110 and feature descriptors 111 of corresponding image feature vectors. Classifications applied by image classification step 704 to center pixels 500 may then be applied to all or some of the other pixels within a corresponding superpixel 303.

Image classification step 704 may thus produce a classified image 705. The classified image 705 may comprise, for example, multiple confidence maps. Each confidence map may represent the likelihood that each pixel of the input digital image 700 belongs to a region associated with a specific ground truth label 151. Multiple confidence maps may be utilized by an operator in various ways. For example, each confidence map could be viewed separately to analyze each distinct region of the classified digital image. Multiple binary confidence maps could be viewed as a colored overlay on the input digital image 700, wherein each classified region is colored differently. Multiple confidence maps could also be viewed as a composite heat map utilizing the intensity of overlapping colors to represent the likelihood of each pixel belonging to a classified region. Multiple confidence maps could also be used as an input to a system for further image recognition tasks. A person of skill in the art will recognize that an image classified according to the present disclosure may be utilized in various different ways.

A superpixel-boosted top-down image recognition framework as shown in FIGS. 6 and 7 may provide several benefits in both training and classification phases. In a training phase using disjoint superpixels 303, feature extraction redundancy may be decreased and image coverage increased, as shown, for instance, in a comparison between FIG. 2 and FIG. 4. In a training phase using superpixels 303 having similar characteristics, extracted features 110 may define a characterized pixel 302 more specifically. For instance, while in a conventional feature extraction process as depicted in FIG. 2, feature extraction region 201 may cross natural image boundaries, such as between the cameraman's hair and the background sky, superpixel 303 defined feature extraction regions, as depicted in FIGS. 5*a*-5*c*, may contain a more homogenous array of pixels. In such a case, extracted features 110 may be drawn from a superpixel 303 feature extraction region containing a high percentage of pixels that represent the cameraman's hair. The features 110 thus extracted may thus more specifically represent a hair region of the image.

In a classification phase, a digital image 700 may be entirely classified using the features 110 of characterized center pixels 500. A conventional top-down image recognition technique may require that each pixel of an image be classified. A high-resolution image may easily have many millions of pixels, each of which requires classification. Because a superpixel-boosted top-down image recognition classification task may classify an entire image by classifying only a subset of its pixels, e.g. characterized center pixels 500, processing time may be reduced. Additionally, in a classification phase of a superpixel-boosted top down image recognition framework, classifying an image based on superpixel boundaries may preserve true boundaries within the image.

Figure 8:
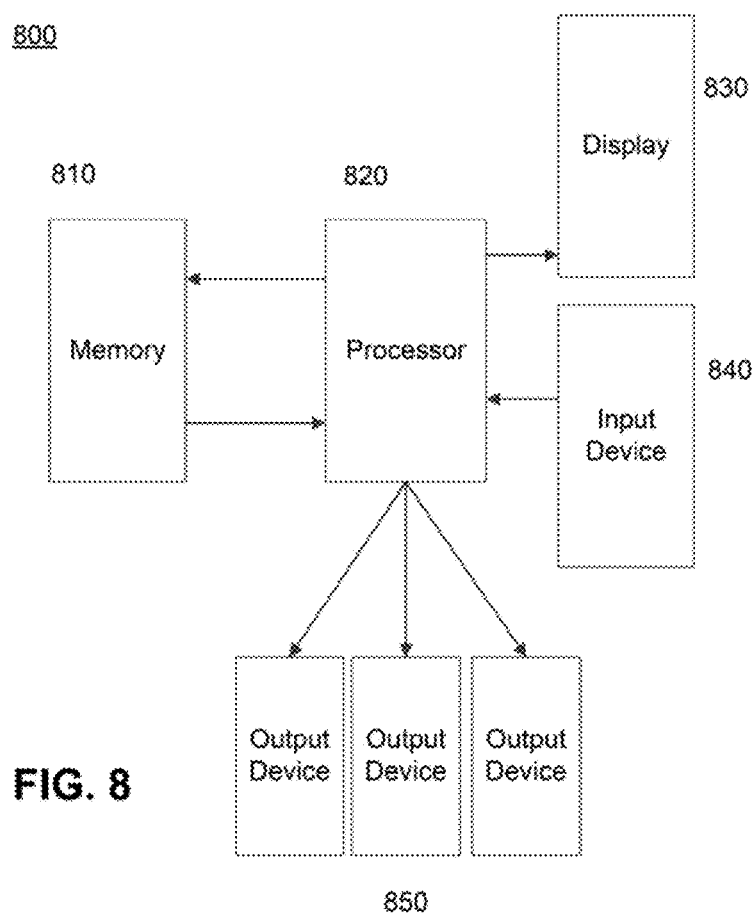
FIG. 8 shows an exemplary system for implementing the disclosed methods and techniques.

FIG. 8 shows an exemplary system 800 for implementing the disclosed methods and techniques. The component and methods described herein may be implemented or carried out, for example, by a system comprising a memory 810, a processor 820, and a display 830, operatively connected to one another by a wired or wireless connection. Images and data sets described herein may be stored in memory 810. Memory 810 may comprise any storage device capable of storing data processed by processor 820. Memory 810 may be, for example, a floppy disk, CD, DVD, or other magnetic medium, or RAM. Processing steps may be carried out by processor 820 implementing processing components. Processor 820 may be any commonly available digital processor or may be a special purpose digital processor. Software comprising instructions to perform the steps described herein or implement the system components described herein may be stored on a tangible memory, such as memory 810, or a computer-readable tangible medium, such as a DVD or CD. Results of the disclosed methods and techniques may be displayed on a computer display 830. A user input device, such as a keyboard 840, may be provided to permit user interaction. Additional output devices 850, such as a printer, may also be provided. In some embodiments, some or all of the components of system 800 may be located remotely from one another. For example, processor 820 and/or memory 810 may be located in the cloud, and accessed by the user via a wireless connection, such as the Internet.

Embodiments of the methods disclosed herein may be implemented as a computer program product, i.e., a computer program comprising instructions tangibly embodied on an information carrier, e.g., in a machine-readable storage device, or a tangible computer-readable medium, which when executed for execution control the operation of one or more computers, processors, or logic to perform the steps of the method. A computer program can be written in any form of programming language, including compiled or interpreted languages, and it can be deployed in any form, including as a standalone program or as one or more modules, components, subroutines, or other unit suitable for use in a computing environment. A computer program can be deployed to be executed on one computer or on multiple computers at one site or distributed across multiple sites and interconnected by a communication network.

Superpixel-boosted top-down image recognition techniques disclosed herein provide means of increasing the efficacy and the efficiency of feature extraction techniques. Utilizing superpixels in a top-down image recognition framework provides additional data for the fast and accurate generation and application of image classification models. Superpixel-boosted top-down image recognition techniques disclosed herein may be used as part of a comprehensive digital image analysis system, for instance, to create top-down confidence maps to serve as input for further image analysis techniques. Techniques disclosed herein may also be used with no additional methods for performing a variety of image classification tasks.

From the foregoing description, it will be appreciated that the present invention provides a method and apparatus for the efficient and accurate classification of a digital image. The proposed superpixel-boosted top-down image recognition framework can be generalized to all types of digital images.

The foregoing methods and systems have been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

From the foregoing description, it will be appreciated that the methods and apparatus described herein to classify the digital images of the examples may be adapted to classify any digital images having characteristics suitable to these techniques, such as high image resolution, non-uniformly distributed texture pattern, and densely structured segments. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented feature extraction method for generating a classification model for a digitized image, the method to be performed by a system comprising at least one processor and at least one memory, the method comprising:
    differentiating by the system the digitized image into a plurality of superpixels, each comprising a plurality of pixels, based on pixel characteristics;
    determining by the system a plurality of center pixels of the plurality of superpixels;
    characterizing by the system the plurality of center pixels of the plurality of superpixels, wherein characterizing by the system the plurality of center pixels of the plurality of superpixels further comprises determining by the system a plurality of feature extraction regions using a three-stage process, wherein the centers of the plurality of feature extraction regions are center pixels of the plurality of superpixels;
    generating by the system a classification model by associating features of the plurality of center pixels with labels of a plurality of ground truths wherein the plurality of ground truths are associated with a plurality of image classifications; and
    outputting by the system a classification model for classifying all or some of the pixels of a second digitized image.

2. The method of claim 1, wherein characterizing by the system the plurality of center pixels of the plurality of superpixels further comprises:
    generating by the system a plurality of features corresponding to the center pixels of the plurality of superpixels; wherein
    each feature of the plurality of features comprises a plurality of feature descriptor values and corresponds to a feature type from among a plurality of feature types; and
    the feature descriptor values of each feature of the plurality of features of each center pixel are determined based on data from the feature extraction region associated with the center pixel.

3. The method of claim 1, wherein each feature extraction region of the plurality of feature extraction regions comprises a circular shape.

4. A computer-implemented feature extraction method for generating a classification model for a digitized image, the method to be performed by a system comprising at least one processor and at least one memory, the method comprising:
    differentiating by the system the digitized image into a plurality of superpixels;
    determining by the system a plurality of center pixels of the plurality of superpixels;
    characterizing by the system the plurality of center pixels of the plurality of superpixels, wherein characterizing by the system the plurality of center pixels of the plurality of superpixels further comprises:
    determining by the system a plurality of feature extraction regions using a three-stage process, wherein the centers of the plurality of feature extraction regions are center pixels of the plurality of superpixels;
    generating by the system a classification model by associating features of the plurality of center pixels with labels of a plurality of ground truths; and
    outputting by the system a classification model for classifying all or some of the pixels of a second digitized image.

5. A computer-implemented feature extraction method for generating a classification model for a digitized image, the method to be performed by a system comprising at least one processor and at least one memory, the method comprising:

differentiating by the system the digitized image into a plurality of superpixels, each comprising a plurality of pixels, based on pixel characteristics;

determining by the system a plurality of center pixels of the plurality of superpixels;

characterizing by the system the plurality of center pixels of the plurality of superpixels, wherein characterizing by the system the plurality of center pixels of the plurality of superpixels further comprises selecting and utilizing one of:

1) determining by the system a plurality of feature extraction regions using a three-stage process, wherein the centers of the plurality of feature extraction regions are center pixels of the plurality of superpixels;

2) generating by the system a plurality of features corresponding to the center pixels of the plurality of superpixels, wherein each feature of the plurality of features comprises a plurality of feature descriptor values and corresponds to a feature type from among a plurality of feature types; and the feature descriptor values of each feature of the plurality of features of each center pixel are determined based on data from the superpixel associated with the center pixel; and 3) generating by the system a plurality of features corresponding to the center pixels of the plurality of superpixels, wherein each feature of the plurality of features comprises a plurality of feature descriptor values and corresponds to a feature type from among a plurality of feature types; and the feature descriptor values of each feature of the plurality of features of each center pixel are determined based on data from the superpixel associated with the center pixel and the superpixels neighboring the superpixel associated with the center pixel;

generating by the system a classification model by associating features of the plurality of center pixels with labels of a plurality of ground truths wherein the plurality of ground truths are associated with a plurality of image classifications; and outputting by the system a classification model for classifying all or some of the pixels of a second digitized image.

* * * * *